(12) United States Patent
Hoyte et al.

(10) Patent No.: US 6,341,678 B1
(45) Date of Patent: Jan. 29, 2002

(54) STRUT

(75) Inventors: David S. Hoyte, McCordsville, IN (US); Stephen H. Bell, Guelph (CA)

(73) Assignee: Gabriel Ride Control Products, Inc., Brentwood, TN (US)

( * ) Notice: Subject to any disclaimer, the term of this patent is extended or adjusted under 35 U.S.C. 154(b) by 0 days.

(21) Appl. No.: 09/612,032

(22) Filed: Jul. 7, 2000

Related U.S. Application Data

(60) Provisional application No. 60/204,626, filed on May 16, 2000.

(51) Int. Cl.[7] ................................................. F16F 9/00
(52) U.S. Cl. ................................................. 188/322.11
(58) Field of Search ........................... 267/64.11, 64.23, 267/64.24, 122; 188/322.11, 322.12; 280/672, 663, 618, 691, 693, 697, 696, 702, 712, 713

(56) References Cited

U.S. PATENT DOCUMENTS 4,883,288 A * 11/1989 Finn ............................. 280/672
6,050,372 A * 4/2000 Fisher ......................... 188/170

* cited by examiner

Primary Examiner—Christopher P. Schwartz
Assistant Examiner—C. T. Bartz
(74) Attorney, Agent, or Firm—McAndrews, Held & Malloy, Ltd.

(57) ABSTRACT

A vehicular suspension strut or shock absorber of the type which is connected to a wheel spindle by means of a mounting bracket and which operates in conjunction with a helical coil spring is disclosed. The suspension strut includes a strut body that has upper and lower increased diameter portions or dimples which form lands for receiving the spring seat assembly and the lower mounting bracket, respectively. The spring seat assembly is adapted to be mounted on and held in place by the upper increased diameter portion or dimples, and the lower mounting bracket is adapted to be mounted on the lower increased diameter portion or dimples, which advantageously avoids having to separately weld the spring seat assembly and mounting bracket to the strut body.

6 Claims, 2 Drawing Sheets i# STRUT

CROSS-REFERENCE TO RELATED APPLICATIONS

This application claims the priority of provisional application Ser. No. 60/204,626, filed May 16, 2000. The entire specification and drawings of the provisional application referred to above are hereby incorporated by reference.

BACKGROUND OF THE INVENTION

Conventional vehicle suspension systems comprise a suspension strut which is connected to a wheel spindle by means of a mounting bracket. The suspension strut operates in conjunction with a helical coil spring which functions to resiliently support the vehicle frame relative to the vehicle wheel, as is well known in the art.

In the past, the mounting bracket used to secure the strut body to the vehicular wheel spindle has been welded onto the lower portion of the strut body. The strut body was also provided with a coil spring-supporting spring seat assembly that was similarly welded to the upper portion of the strut body.

One disadvantage of welding the mounting bracket and spring seat assembly to the strut body is that the welding operation is labor-intensive, which increases the cost of production and minimizes the ability to use automation in the manufacturing process. The present invention provides an improved suspension strut which obviates the above disadvantage by providing a strut construction that eliminates the need for welding the spring seat assembly and the mounting bracket onto the strut body.

SUMMARY OF THE INVENTION

It is accordingly an object of the invention to provide an improved strut for vehicle suspension systems.

Another object of the invention is to provide structures on the strut body by which a mounting bracket and spring seat assembly can be easily secured to the strut body.

Another object of the invention is to provide means for securing a spring seat assembly and a mounting bracket to the strut body which eliminates or reduces the need to weld such parts to the strut body.

A further object of the invention is to provide a strut which permits the use of automation to achieve a high production volume.

A further object of the present invention is to provide an improved strut construction wherein the strut body has an upper, increased outer diameter portion for securely receiving the spring seat assembly, and a lower, increased outer diameter portion for receiving the mounting bracket. In one embodiment of the invention, the upper and lower increased diameter portions comprise upper and lower sets of dimples equidistantly spaced about the circumference of the strut body.

Other objects and advantages of the present invention will become more apparent from a consideration of the following detailed description taken in conjunction with the accompanying drawings.

DETAILED DESCRIPTION OF THE PREFERRED EMBODIMENTS

The present invention relates to an improved automotive suspension strut or shock absorber of the type having inner and outer twin tube cylinders with a valved piston reciprocally disposed within the inner cylinder. Struts of this type are conventional and well known in the art. Another strut construction useful in the present invention is disclosed in co-pending application Ser. No. 09/612,031, filed July 7, 2000, which is also herein incorporated by reference. The strut is connected at one end to the vehicle wheel spindle and at the other end to the vehicle body or frame, and operates in conjunction with a helical coil spring that, in part surrounds the strut body.

Figure 1:
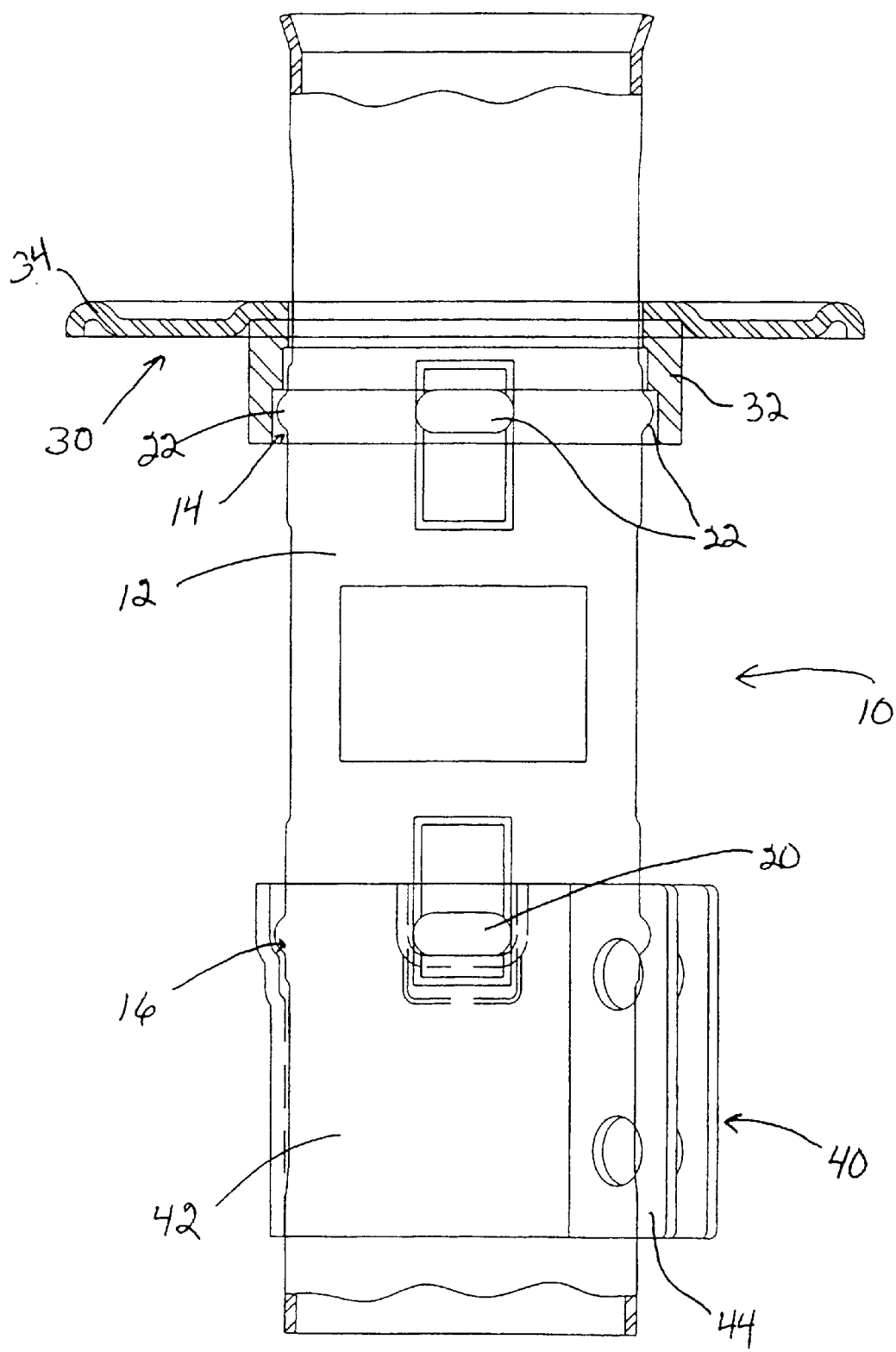
FIG. 1 is a partial sectional view of a suspension strut embodying the present invention.

Referring now to the drawings and in particular FIG. 1, a suspension strut according to the present invention is generally designated by the numeral 10. The strut 10 includes a strut body 12 having an outer surface which is provided with an increased diameter portion 14 at its upper end and an increased diameter portion 16 at its lower end. The upper end increased diameter portion 14 forms a land for receiving a radially extending spring seat assembly, generally designated at 30, and the lower end increased diameter portion 16 forms a land for receiving a mounting bracket 40, as will be discussed in further detail below.

Figure 2:
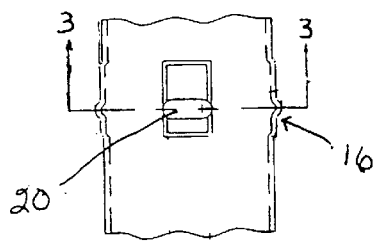
FIG. 2 is a partial side view of the lower portion of the strut body.
Figure 3:
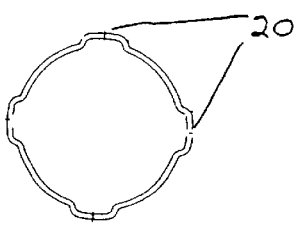
FIG. 3 is a sectional view of FIG. 2 taken along line 3—3 thereof.

As best illustrated in FIGS. 2 and 3, the lower end increased diameter portion 16 comprises a plurality of bumps or dimples 20 that project radially outward from the outer surface 20 of the strut body 12. Although two opposed pairs of such dimples 20 are illustrated, it will be appreciated that the increased diameter portion 16 could have other configurations, such as one pair of opposed bumps or dimples or, alternatively an annular projection extending outwardly from the circumference of the strut body. As shown in FIG. 1, the upper end increased diameter portion 14 similarly comprises two opposed pairs of dimples 22, although other configurations that project outwardly from the outer surface of the strut body are possible.

The strut body 12 is provided with a radially outwardly extending spring seat assembly 30 upon which the lower end of a coil spring (not shown) is supported. The spring seat assembly 30 comprises a spring retainer support 32 and a washer-like spring retainer 34 which abuts the spring retainer support 32 and which has an upper surface that defines a spring seat for receiving the lower end of the coil spring. The inner surface of the spring retainer support 32 has a stepped configuration which is adapted to fit over the dimples 22 or other increased diameter portion such that the spring retainer support 32 is frictionally mounted on the strut body 12, as illustrated in FIG. 1.

The strut body 12 is also provided with a mounting bracket 40 that serves to mount the strut body onto a vehicular wheel spindle. The mounting bracket 40 comprises a sleeve-shaped holding section 42 that surrounds the lower end of the strut body and an outwardly extending attaching section 44 which is adapted to be connected by suitable screws, bolts or similar threaded fastening means to a vehicular wheel spindle.

Figure 4:
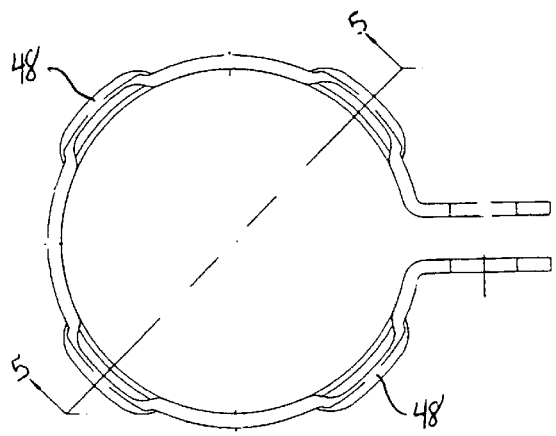
FIG. 4 is a top view of a mounting bracket for the strut embodying the present invention.
Figure 5:
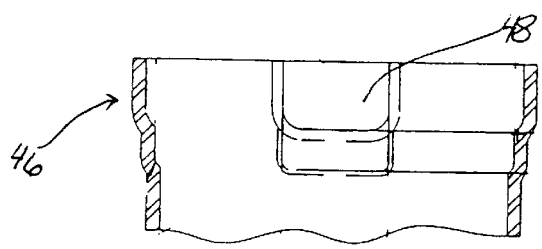
FIG. 5 is a sectional view of FIG. 4 taken along line 5—5 thereof.

The holding section 42 has an increased diameter portion 46 that corresponds to the increased diameter portion 16 at the lower end of the strut body 12 so that the holding section 42 can be slid onto the lower end of the strut body, with the increased diameter portion 46 mounted on the increased diameter portion 16 of the strut body. As best illustrated in FIGS. 4 and 5, the increased diameter portion 46 of the holding section 42 comprises two opposed pairs of outwardly projecting bumps 48. These bumps are configured to receive the opposed pairs of dimples 20 on the lower end of the strut body, as illustrated in FIG. 1.

To assemble the suspension strut of the present invention, the spring retainer support 32 is mounted onto the strut body 12 so that the inner surface of the spring retainer support is in engagement with the upper dimples 22. The spring retainer 34 is also mounted onto the strut body 12 and abuts the spring retainer support 32. The mounting bracket 40 is then slid onto the strut body .12 so that the bumps 48 are mounted onto the lower dimples 20 of the strut body 12. If necessary, the mounting bracket 40 may be tack welded to the strut body 12 to hold it in place until the suspension strut is mounted onto the vehicle. Alternatively, the mounting bracket, along with the bumps 48 can be configured so as to have a friction fit with the lower dimples 20 thereby holding the mounting bracket in place until the strut is assembled onto the vehicle.

As will be apparent to those of skill in the art, the present invention permits the manufacture of a family of "generic" strut bodies which can be manufactured and tested at a central plant and then shipped for final assembly at the site where they will be installed. Such manufacture advantageously permits the use of automation so as to achieve an economy of scale and logistics and leads to enhanced product standardization.

Numerous modifications may be made to the foregoing invention without departing from the basic teaching thereof. Although the present invention has been described with reference to one or more specific embodiments, those of skill in the art will recognize that changes may be made thereto without departing from the scope and spirit of the invention as set forth in the appended claims.

What is claimed is:

1. An improved suspension strut for an automotive vehicle, the suspension strut comprising:

(a) a cylindrically shaped strut body having a first diameter portion on its upper end thereof and a second diameter portion on its lower end thereof, with the upper end first diameter portion comprises a plurality of dimples projecting radially outwardly from the strut body;

(b) a radially outwardly extending spring seat assembly mounted on the upper end first diameter portion, the spring seat assembly defining a coil spring seat; and (c) a mounting bracket for attaching the suspension strut to a wheel spindle, the mounting bracket comprising a holding section which is mounted on the lower end second diameter portion of the strut body and an attaching section extending outwardly from the holding section for releasably joining the mounting bracket to the wheel spindle.

2. A suspension strut in accordance with claim 1 wherein the plurality of dimples comprises two pairs of opposed dimples.

3. A suspension strut in accordance with claim 1 wherein the spring seat assembly has an inner surface having a stepped configuration adapted to engage the dimples.

4. A suspension strut in accordance with claim 1 wherein the lower end increased diameter portion comprises a plurality of dimples projecting radially outwardly from the lower end of the strut body.

5. A suspension strut in accordance with claim 4 wherein the plurality of dimples comprises two pairs of opposed dimples.

6. A suspension strut in accordance with claim 4 wherein the holding section has an inner surface configuration that is adapted to receive the plurality of dimples.

\* \* \* \* \*